(12) United States Patent
Seibold et al.

(10) Patent No.: US 11,640,485 B1
(45) Date of Patent: May 2, 2023

(54) GENERATING CAD MODELS FROM TOPOLOGY OPTIMIZATION DATA

(71) Applicant: Ansys, Inc., Canonsburg, PA (US)

(72) Inventors: Wolfgang Seibold, Lafayette, CO (US); Brian Tomas, Boulder, CO (US); Matthias Messner, Eldorado Springs, CO (US)

(73) Assignee: Ansys, Inc., Canonsburg, PA (US)

( * ) Notice: Subject to any disclaimer, the term of this patent is extended or adjusted under 35 U.S.C. 154(b) by 289 days.

(21) Appl. No.: 17/069,941

(22) Filed: Oct. 14, 2020

Related U.S. Application Data

(60) Provisional application No. 62/958,569, filed on Jan. 8, 2020.

(51) Int. Cl.
*G06F 30/12* (2020.01)
*G06F 30/10* (2020.01)
*G06T 17/20* (2006.01)

(52) U.S. Cl.
CPC .............. *G06F 30/12* (2020.01); *G06F 30/10* (2020.01); *G06T 17/20* (2013.01)

(58) Field of Classification Search
None
See application file for complete search history.

(56) References Cited

U.S. PATENT DOCUMENTS

| | | | |
|---|---|---|---|
| 2013/0127847 A1* | 5/2013 | Jin | G06T 19/20 345/420 |
| 2019/0388123 A1* | 12/2019 | Pavlovskaia | A61B 90/37 |
| 2020/0051333 A1* | 2/2020 | Shayani | G06T 17/30 |
| 2020/0150624 A1* | 5/2020 | Marinov | G06F 30/10 |

OTHER PUBLICATIONS

Bommes, David, et al. "Quad Meshing." Eurographics (State of the Art Reports). 2012.*
Owen, Steven J., and David R. White. "Mesh-based geometry." International Journal for Numerical Methods in Engineering 58.2 (2003): 375-395.*
Doutre, Pierre-Thomas, et al. "Comparison of some approaches to define a CAD model from topological optimization in design for additive manufacturing." Advances on Mechanics, Design Engineering and Manufacturing. Springer, Cham, 2017. 233-240.*

* cited by examiner

*Primary Examiner* — Sultana M Zalalee
(74) *Attorney, Agent, or Firm* — Jones Day

(57) ABSTRACT

A first computer-aided design (CAD) model to represent a physical object is received that includes a triangle mesh with boundary condition faces. Thereafter, the triangle mesh is smoothed such that the boundary condition faces are maintained. The smoothed triangle mesh is then segmented. As part of such segmenting, a plurality quads are generated. Each of the quads is then fitted with a non-uniform rational basis spline (nurbs) patch. A second CAD model is next generated to represent the physical object which is based on the plurality of quads fitted with nurbs. Related apparatus, systems, techniques and articles are also described.

20 Claims, 17 Drawing Sheets

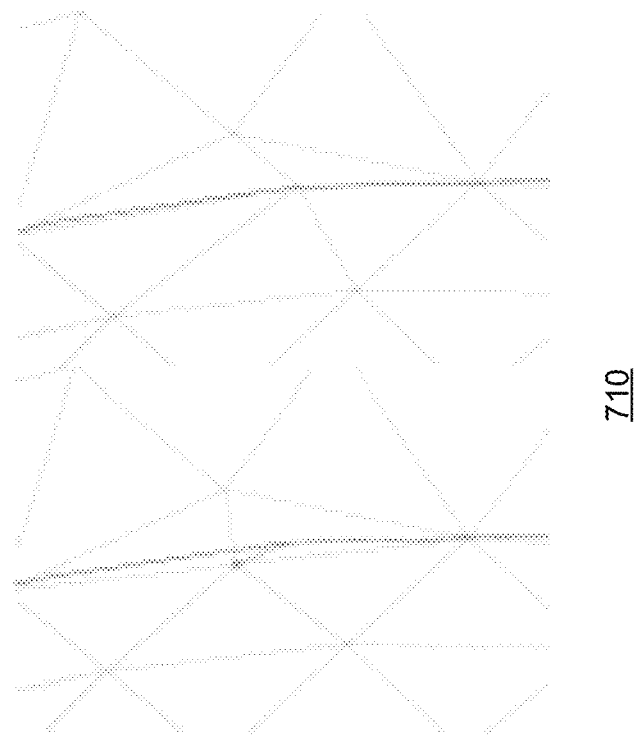
FIG. 7

GENERATING CAD MODELS FROM TOPOLOGY OPTIMIZATION DATA

RELATED APPLICATION

The current application claims priority to U.S. Pat. App. Ser. No. 62/958,569, filed on Jan. 8, 2020, the contents of which hereby fully incorporated by reference.

TECHNICAL FIELD

The subject matter described herein relates to generation of computer-aided design (CAD) models from topology optimization data.

BACKGROUND

CAD models can be represented in a Boundary Representation (BREP) form in which a solid object is embodied as a collection of connected surface elements which together define a boundary between solid and non-solid aspects of the object. Faces, edges, and vertices of the CAD model can be optimized using Topology Optimization (TO). The output of this optimization is a model (or optimized CAD model) represented either in voxels or in a triangle mesh. A voxel or volumetric representation of a model describes the locations in space which have material as opposed to a triangle mesh which describes the boundary between solid and empty. Existing tools to convert an optimized CAD model back to a BREP model tend to generate excessive faces. In addition to generating a large amount of faces, faces in the resulting BREP model may not be curvature aligned and original boundary condition faces in the CAD model may not always be retained. A face is curvature aligned if its boundary curves follow principle curvatures.

SUMMARY

In a first aspect, a first computer-aided design (CAD) model to represent a physical object is received that includes a triangle mesh with boundary condition faces. Thereafter, the triangle mesh is smoothed such that the boundary condition faces are maintained. The smoothed triangle mesh is then segmented. As part of such segmenting, a plurality quads are generated. Each of the quads is then fitted with a non-uniform rational basis spline (nurbs) patch. A second CAD model is next generated to represent the physical object which is based on the plurality of quads fitted with nurbs.

The first CAD model can be a topology optimization (TO) model. The smoothing can result in an open smooth triangle mesh. The triangles can be selectively smoothed such that triangles corresponding to the boundary condition faces are unchanged and all triangles have angles below a threshold. The smoothing can also include triangulating the boundary condition faces.

The triangle mesh corresponding to the boundary condition faces can be thickened. A shrinkwrap operation can then be performed on the thickened triangle mesh and on the triangle mesh with the triangles removed (which results in a solid mesh with no holes). The triangles in the triangle mesh after performing of the shrinkwrap operation can be classified as belong to boundary condition faces or TO triangles.

Edges and vertices of TO triangles having curvature above a threshold and requiring smoothing can be identified so that they can be smoothed using a loop subdivision scheme. In some variations, all TO triangles can be smoothed using a bilinear filter. Any remaining boundary condition faces can be deleted from the triangle mesh to result in the open triangle smooth mesh.

A smooth crossfield and corresponding singularities can be computed for the open triangle smooth mesh which is aligned to the boundary and principle curvature aligned on the inside. The open triangle smooth mesh can be smoothed to reduce the computed singularities. At least a portion of the crossfield coherent arcs between singularities can be traced (which can reduce the complexity of quad generation). An optimal layout of the plurality of quads can be determined based on the calculated arcs and T-junctions can be generated for any remaining patches.

An edge of the layout of the plurality of quads can be smoothed by moving a window along the edge over curves of the triangle mesh, flattening each curve into two dimensions (2D), smoothing the flattened 2D curves, and re-projecting the smoothed, flattened 2D curves back to three dimensions (3D).

A smooth normal field can be calculated for each curve. All patches along the boundary conditions can be stitched together to form the second CAD Model.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter reduces the number of faces when converting an optimized CAD model back to a BREP form. In addition, the current subject matter is advantageous in that faces in a resulting BREP model will be curvature aligned and, additionally, original boundary condition faces in the CAD model will be retained.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is a diagram illustrating results of snapping a vertex to a boundary curve and, additionally, areas of high curvature which require smoothing;

DETAILED DESCRIPTION

The current subject matter is directed to generating a computer-aided design (CAD) model approximating a triangle mesh originating from Topology Optimization (TO) of an original CAD model. As will be described in further detail below, the CAD model is generated from a TO model using three main operations: (i) smoothing a triangle mesh (smoothing); (ii) generating a quad layout on top of the triangle mesh (segmenting); and (iii) fitting nurbs surfaces to the quad layout (fitting). Such an arrangement is advantageous in that the resulting CAD model is generated automatically with curvature-aligned faces while retaining the original boundary condition faces of the original CAD model.

Figure 1:
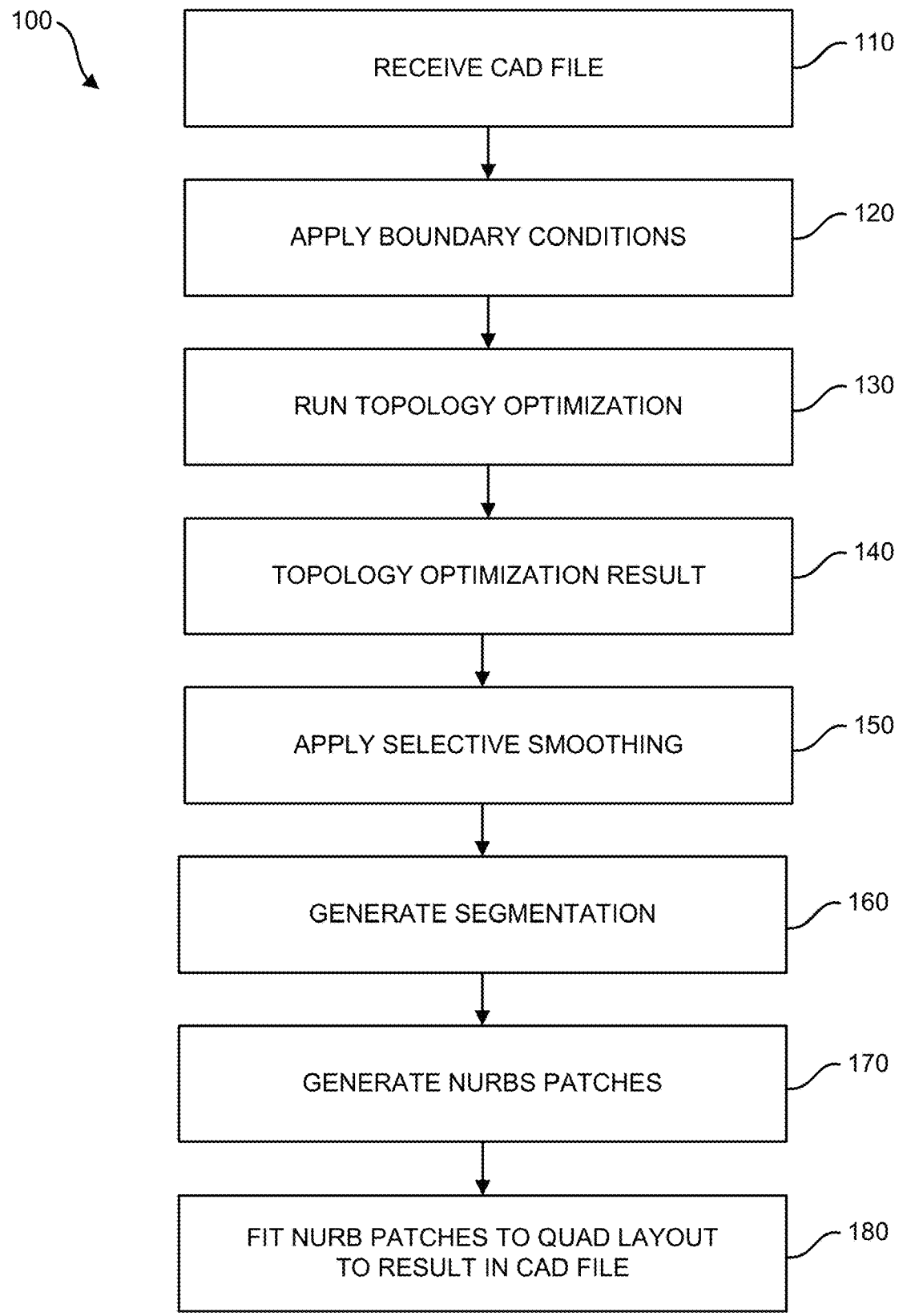
FIG. 1 is a process flow diagram illustrating the generation of a CAD model from a topology optimization of an original CAD model.

With reference to diagram 100 of FIG. 1, data encapsulating a CAD file is received at 110. Thereafter, at 120, boundary conditions are applied to the CAD file followed by, at 130, a topology optimization (TO) to result in a TO model 140 which comprises a triangle mesh. Thereafter, at 150, selective smoothing is applied to the triangle mesh. A quad layout is then generated, at 160, on top of the triangle mesh. Nurb patches/surfaces are then, at 170, fit to the quad layout to result in a CAD file 180.

Figure 2:
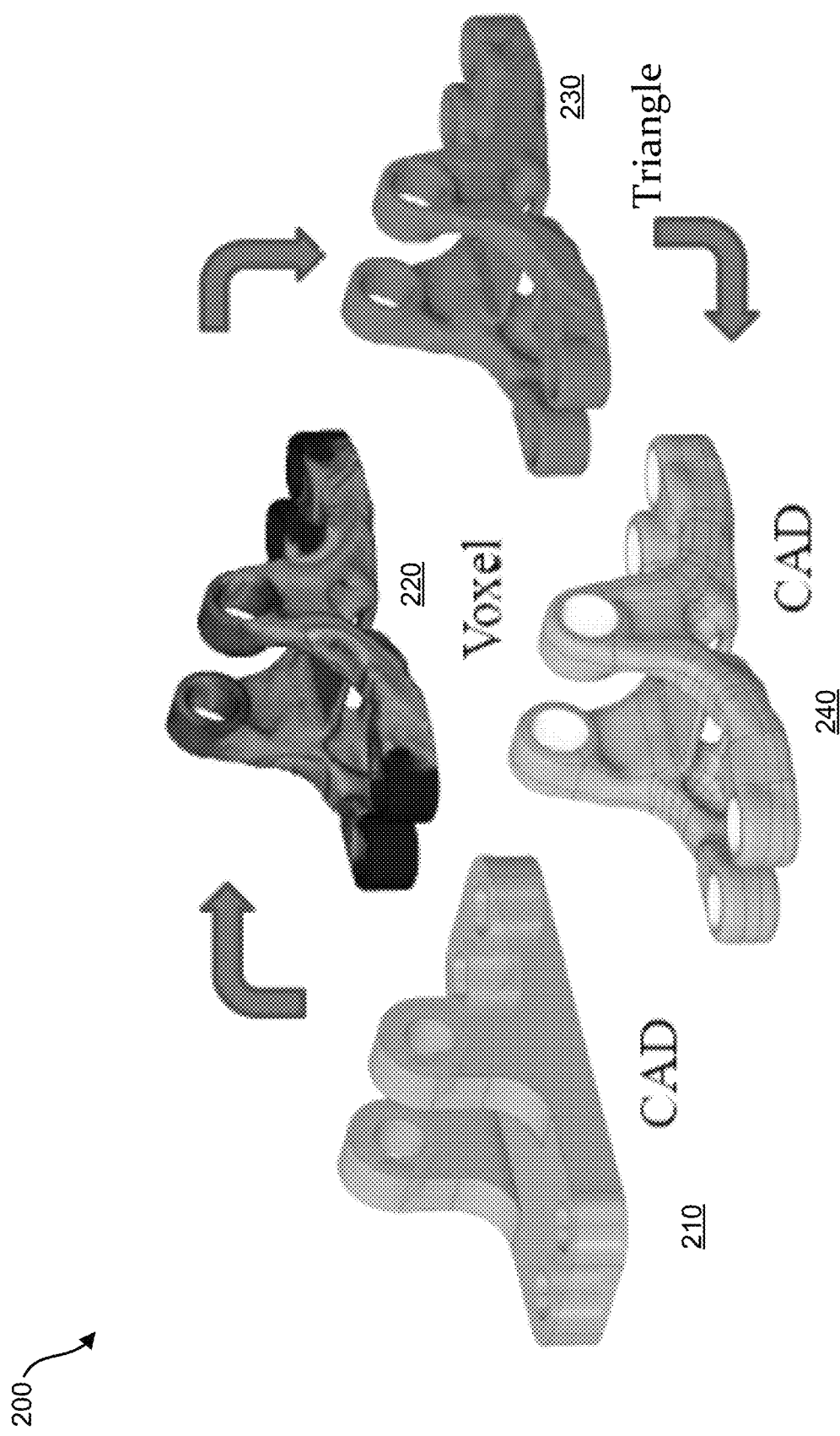
FIG. 2 is a diagram illustrating a topology optimization workflow for a physical object.
Figure 3:
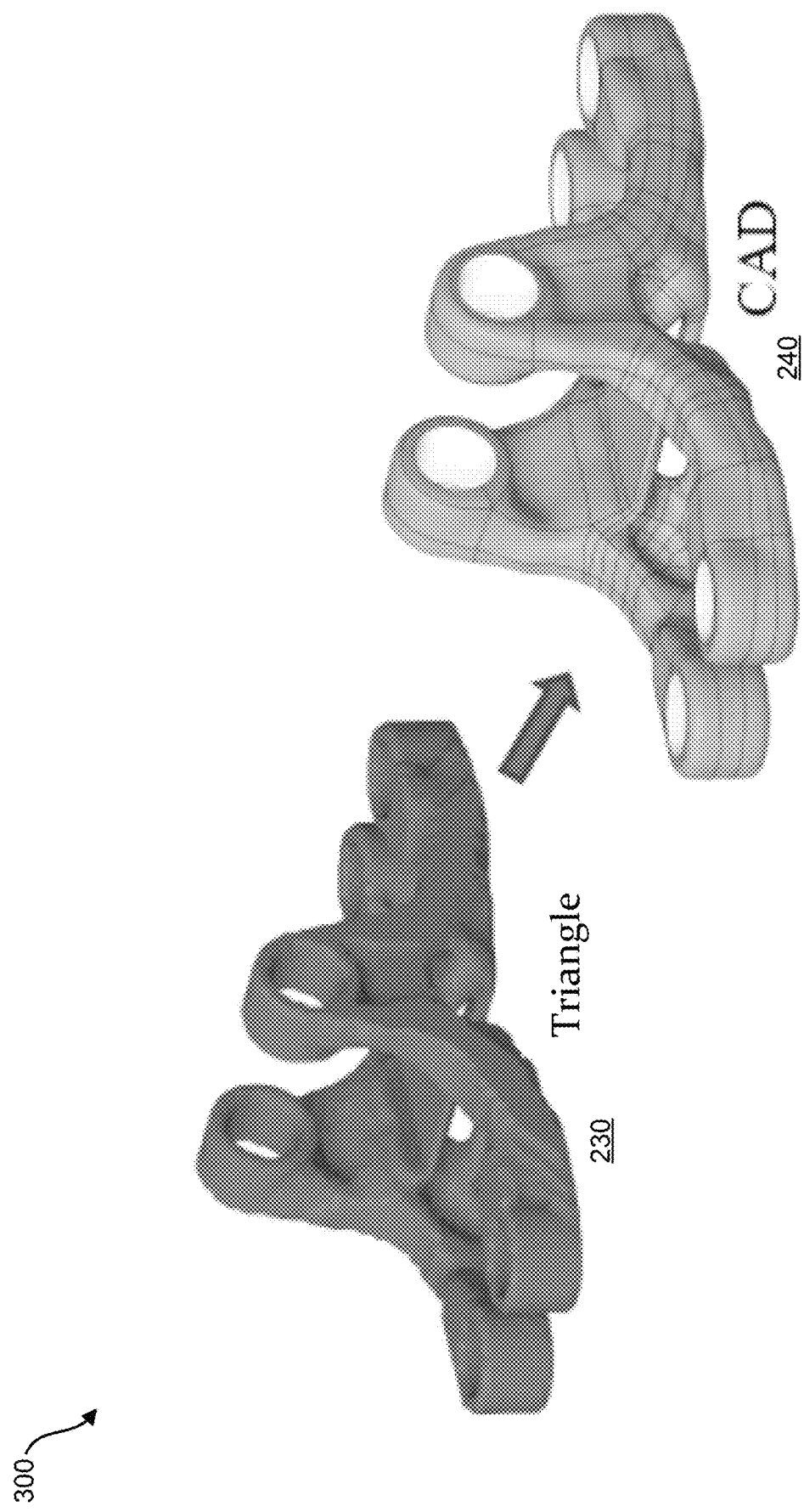
FIG. 3 is a diagram illustrating transformation of unsmoothed faces to a CAD representation.

FIG. 2 is a diagram 200 providing a visualization of aspects of the current subject matter in which, at 210, an original CAD model is optimized using TO to result in a hexahedronal representation of the model 220. The TO voxel representation 220 is subsequently triangulated to result in a triangulated version of the model 230 which is later transformed back into a CAD model 240. FIG. 3 is diagram 300 that provides a different view of the transformation from the unsmoothed faces 230 to the CAD model 240.

As will be described in further detail below, the smoothing operations can be conducted in such a manner as to leave boundary condition faces intact (e.g. unaffected by smoothing). Segmentation operations can be performed to provide curvature aligned faces since the segmentation traces paths along principle curvatures of the model. The generated CAD model can become a watertight solid model as a result of smoothly connected BREP nurbs patches hooking up tightly to the boundary condition faces.

Figure 4:
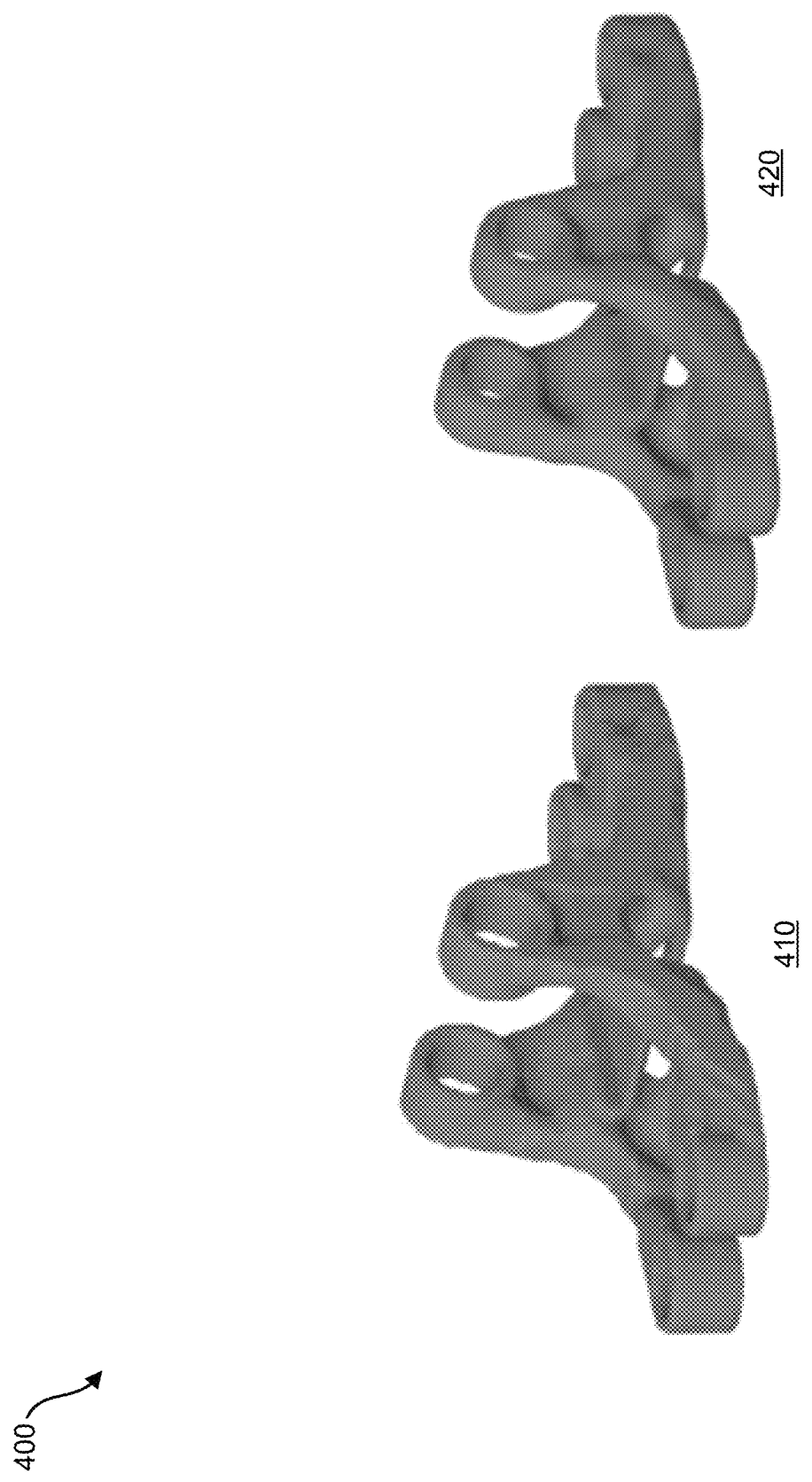
FIG. 4 is a diagram illustrating an unsmoothed triangle mesh and, additionally, a selectively smoothed triangle mesh.
Figure 5:
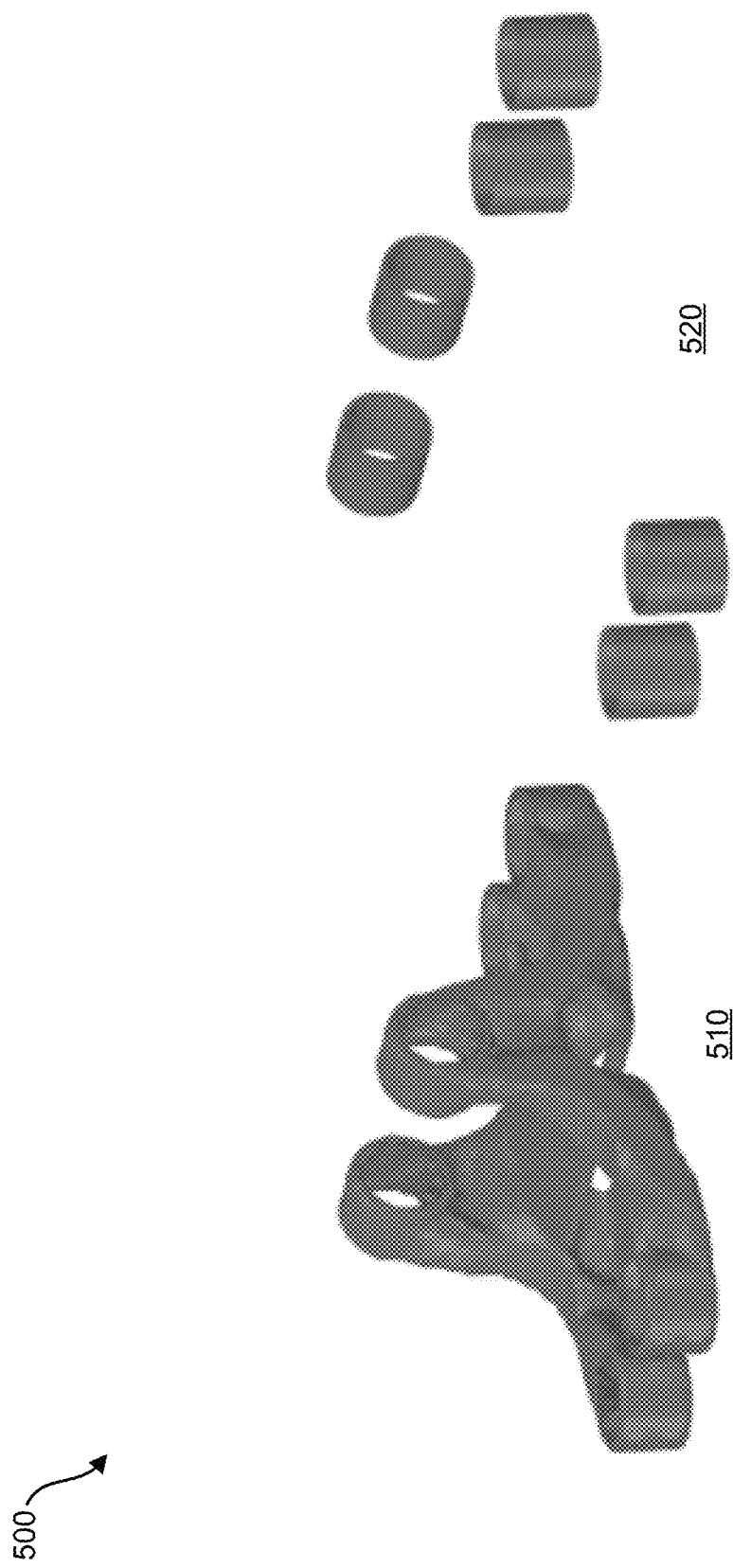
FIG. 5 is a diagram illustrating mesh after deleting triangles corresponding to boundary condition faces and, additionally, boundary condition faces triangulated and thickened.

FIG. 4 is a diagram 400 illustrating an unsmoothed triangle mesh 410 and a selectively smooth triangle mesh 420. Selective smoothing can be applied to the rough triangulated output from TO (e.g., 230) as follows. The triangles corresponding to a boundary condition (bc) are removed 520. The bc faces are then triangulated at a tighter tolerance to generate a more exact mesh at those locations (which is defined as a factor of the voxel resolution of the original Topology Optimization model). An automatic tolerance value can be estimated from the voxel resolution or the average edge length of the model. The mesh 510 corresponding to the bc faces is then thickened as shown in diagram 500 of FIG. 5. The thickening can ensure that the shrinkwrap operation can act on a solid such that no gaps are produced. The offset distance of the thickening operation again is tied to estimated automatic tolerance as mentioned above. A shrinkwrap operation 610 is then performed on this thickened mesh and the mesh from TO with triangles removed as in diagram 600 of FIG. 6.

Figure 6:
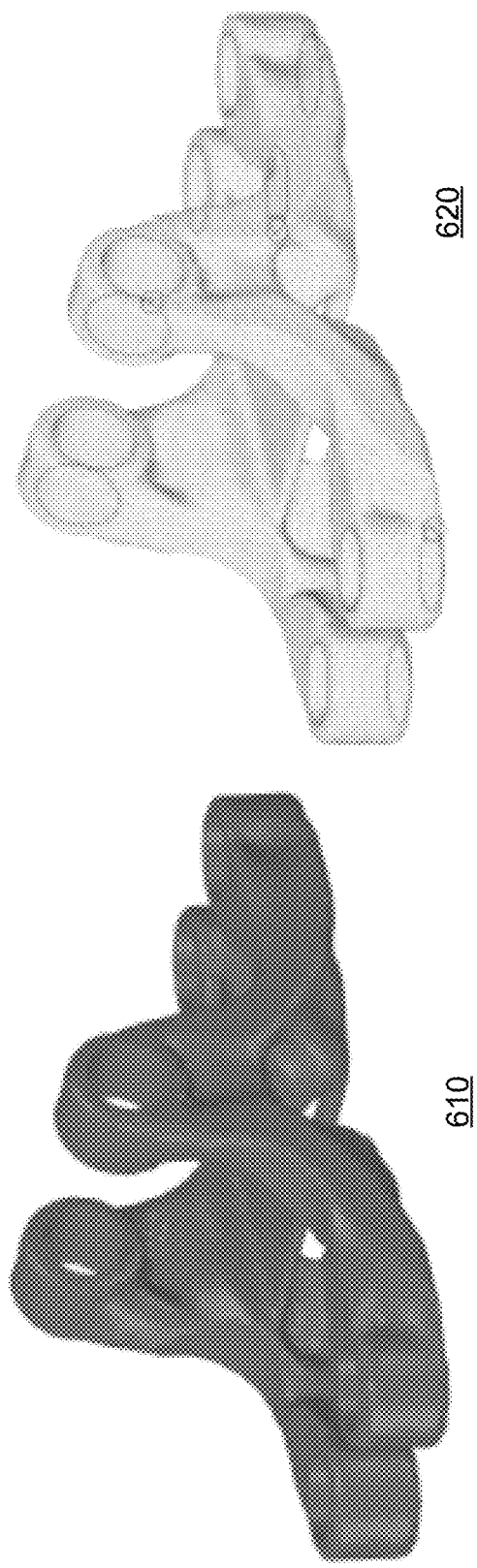
FIG. 6 is a diagram illustrating mesh after shrink wrapping thickened boundary condition faces and open mesh together and, additionally, vertex locations to snap to the boundary curves of the boundary condition faces.

The shrinkwrap operation as shown in FIG. 6 can remesh the meshes with an appropriate edge length as explained above and act as a low pass filter, closing the gaps between the bc faces mesh. The shrinkwrap operation can also keep a rough mapping of original bc faces triangles and the remeshed ones. The result of the shrinkwrap is a solid triangle mesh with selected triangles. The selected triangles correspond to the bc faces and do not need to be smoothed in later steps. Therefore, successive smoothing operations can be applied only on the triangles of the mesh which are not associated with the bc faces. This ensures that the bc face triangles are not changed since smoothing will move triangle nodes to flatten the angle between neighboring triangles.

A subsequent operation can ensure that the mapping between the bc face triangles is as good as possible. Triangles are compared to the bc faces within a tolerance (similar chosen as above) to ensure that none are missed. Triangles within the threshold are then added to the mapping, triangle vertices within the tolerance are snapped to the boundary edges of the bc faces, and triangle edges are subdivided if they are too far away from the boundary of be faces (this arrangement provides a better approximation for sharp corners as in diagram 700 of FIG. 7).

Figure 8:
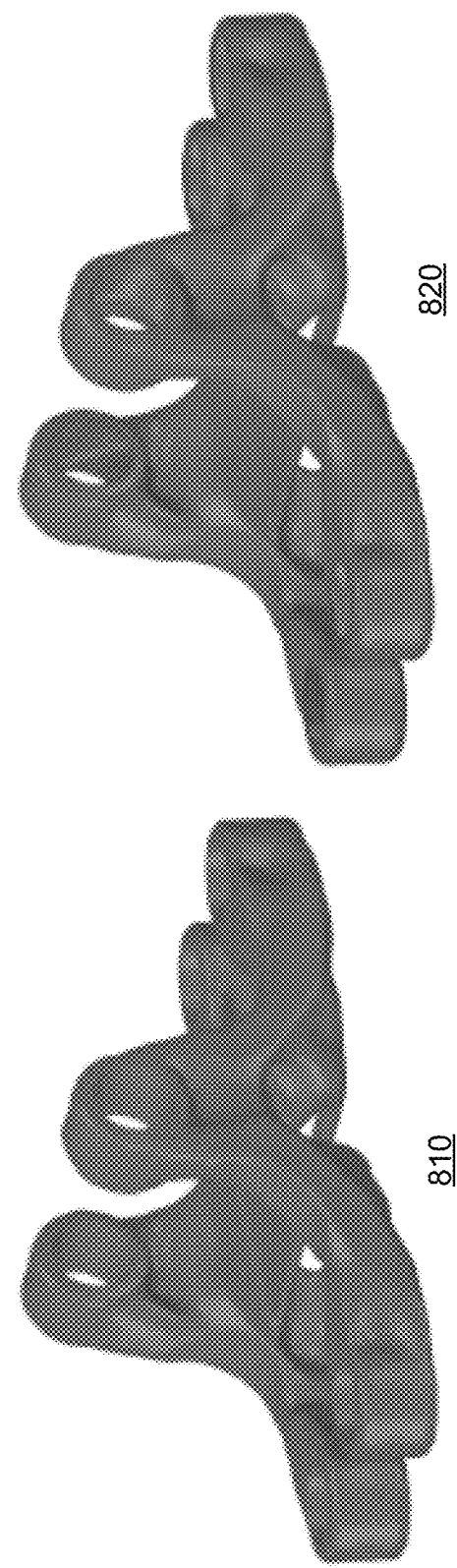
FIG. 8 is a diagram illustrating mesh after several smoothing steps with higher resolution in high curvature areas and, additionally, open mesh as an input to a segmentation operation.
Figure 9:
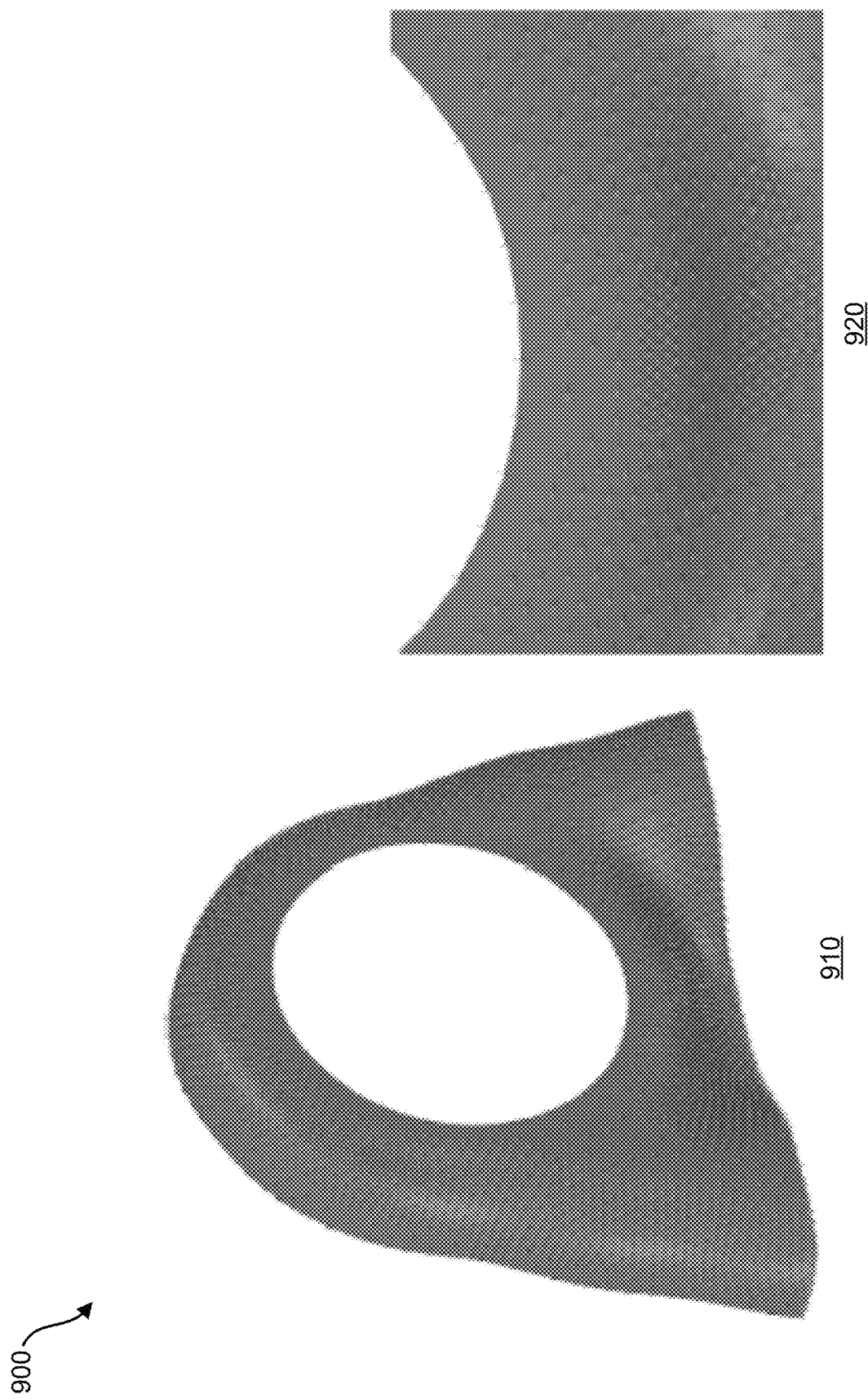
FIG. 9 is a diagram illustrating a curvature and boundary aligned crossfield and, additionally, a boundary close up view.

Given the mapping, triangles in the mesh can be classified as belonging to be faces or TO triangles. The next operation is to find edges and vertices of these TO triangles which have high curvature and need to be smoothed 710 in FIG. 7. High curvature in the discrete sense (triangle mesh) is defined either by the angle between the face normals of neighboring triangles, or by the vertex angle deficiency. Vertex angle deficiency is defined as the sum of all the angles of the triangles at the vertex. The further the sum deviates from two pi the higher the curvature of the vertex. These high curvature areas are then smoothed using a Loop subdivision scheme (see, for example, C. T. Loop, *Smooth Subdivision Surfaces Based on Triangles*, M.S. Thesis, Department of Mathematics, University of Utah, August 1987) as illustrated in diagram 800 of FIG. 8. Then all TO triangles are smoothed using a Guided Mesh Normal Filtering (see, for example, W. Zhang, et al., *Guided Mesh Normal Filtering*, Pacific Graphics Volume 34 (2015), Number 7) step to smooth out low frequency noise. Finally, two more Loop subdivision smoothing can be applied to any left-over high curvature of the TO triangles and the bc faces triangles are deleted from the mesh 820 of FIG. 8.

The input to the segmentation step can be an open or closed smooth triangle mesh 820. With reference to diagram 900, first a crossfield 910 and its singularities are computed. The crossfield in general is aligned to the principle curvatures of the mesh, but can be forced to be aligned to the boundary. To ensure a smooth cross field, one allows the field to deviate from the principle curvature directions of the triangles. A smoother field has less singularities and will produce a CAD model with less patches since the singularities of the crossfield are going to be vertices in the final CAD model.

Figure 10:
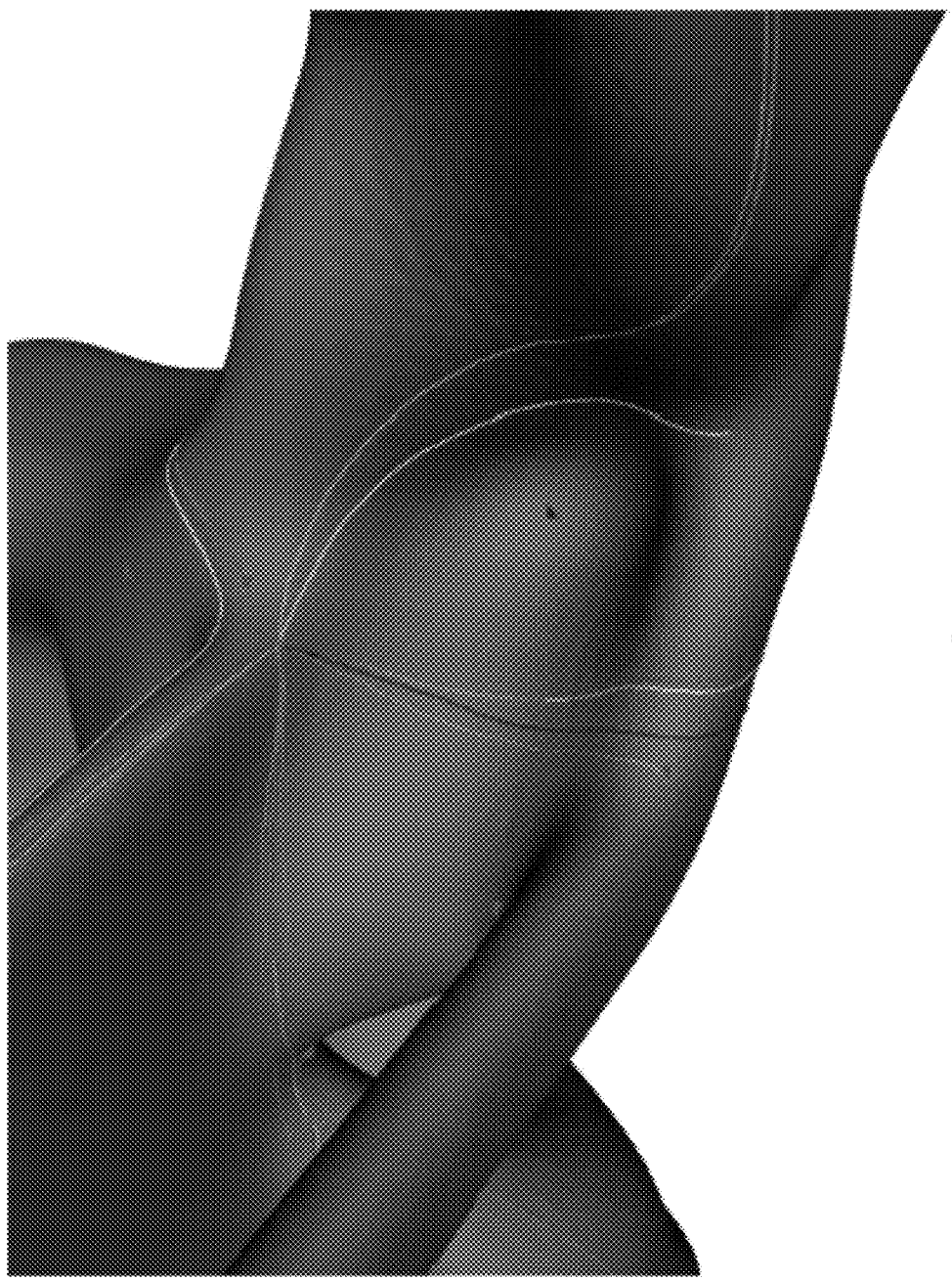
FIG. 10 is a diagram illustrating tracing arcs from one singularity to other possible edges of a quad layout.
Figure 11:
FIG. 11 is a diagram illustrating all possible arcs on an open mesh.

In order to generate a quad layout on top of the triangle mesh, connections or arcs between singularities need to be calculated as in diagram 1100 of FIG. 11. These arcs need to be field aligned but can drift some from the exact field direction. This is necessary so that arcs between singularities can be traced. All possible arcs between singularities are computed in parallel as in diagram 1000 of FIG. 10. To find an optimal quad layout a mixed integer problem must be solved. The solution to the mixed integer problem yields an initial but incomplete layout with some singularities missing of their outgoing arcs and, hence, contains some non-quads. The remaining non-quads can be subdivided into quads by tracing arcs (see, for example, Pietroni et al., Tracing Field-Coherent Quad Layouts, Pacific Graphics Volume 35 (2016, Number 7) starting at a singularity and ending as T-junctions at an existing arc. The result of the segmentation is shown in diagram 1200 of FIG. 12.

Figure 12:
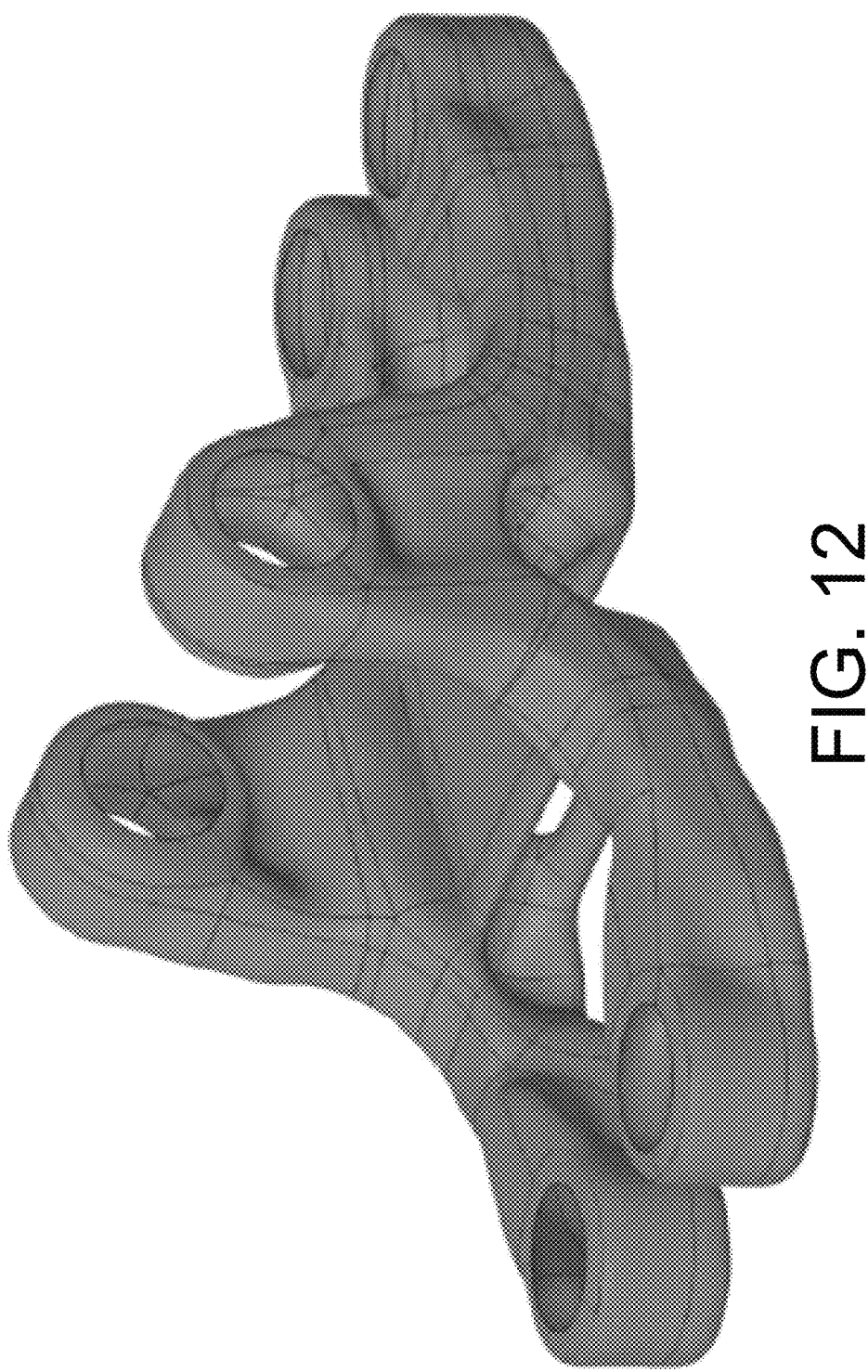
FIG. 12 is a diagram illustrating a segmentation curve overlaid onto a triangle mesh.

Give a segmentation as in FIG. 12, each one of those quads needs to be fitted with a nurbs patch to generate a CAD model. The edges of the quad patches are polylines which are jagged due to the nature of the construction. In order to produce smooth surface patches with as few as possible control points, the edges of the quad layout need to be smoothed first. The edge smoothing is done by moving a window along the edge and flattening the curve locally, smoothing the flattened 2D curve and then reprojecting back to 3D. Here, the objective is to produce smooth curves which lie on the triangle mesh which can be accomplished by projecting the flattened points back onto the triangle mesh.

Figure 13:
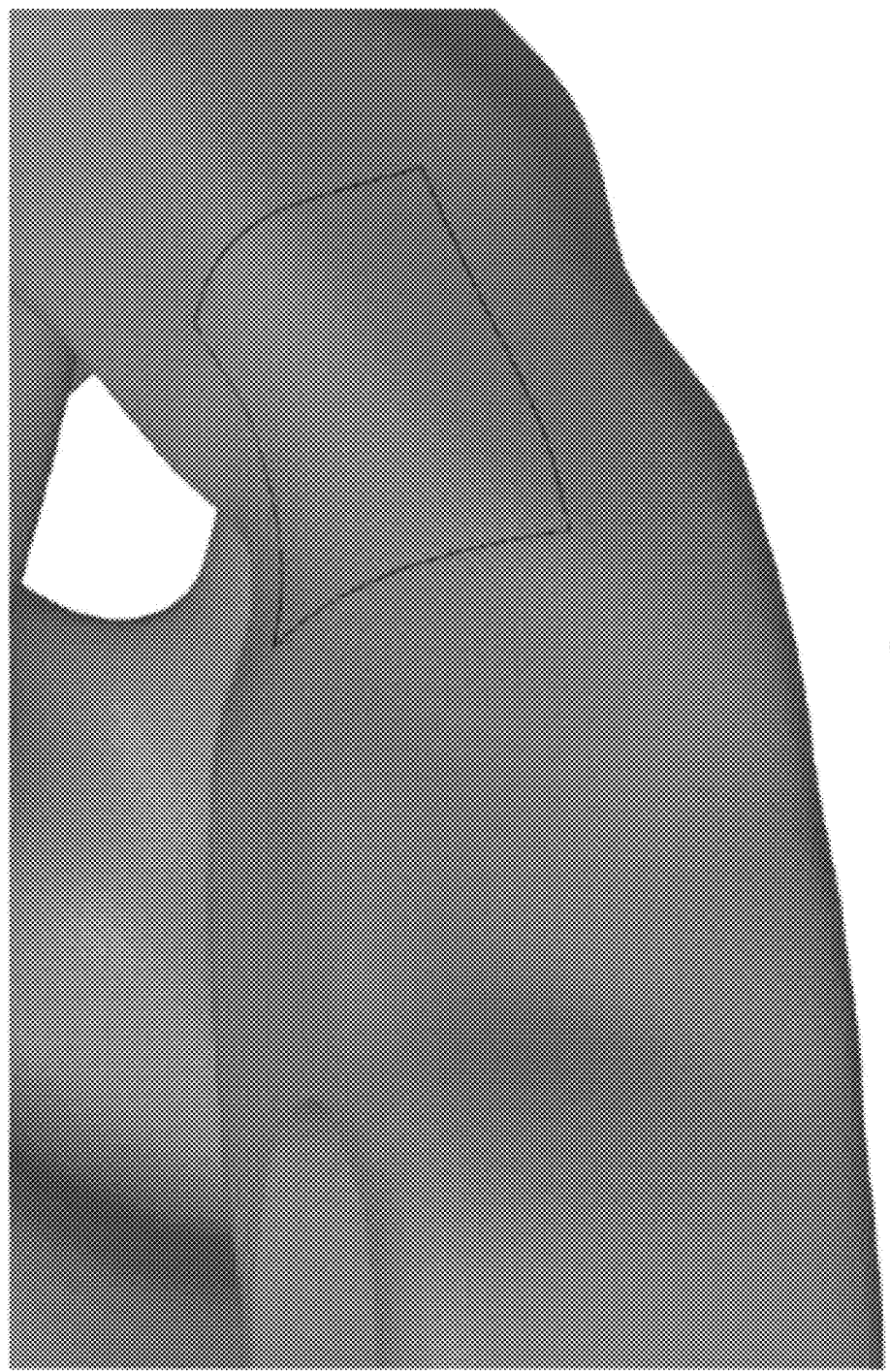
FIG. 13 is a diagram illustrating a triangle area corresponding to one quad.
Figure 14:
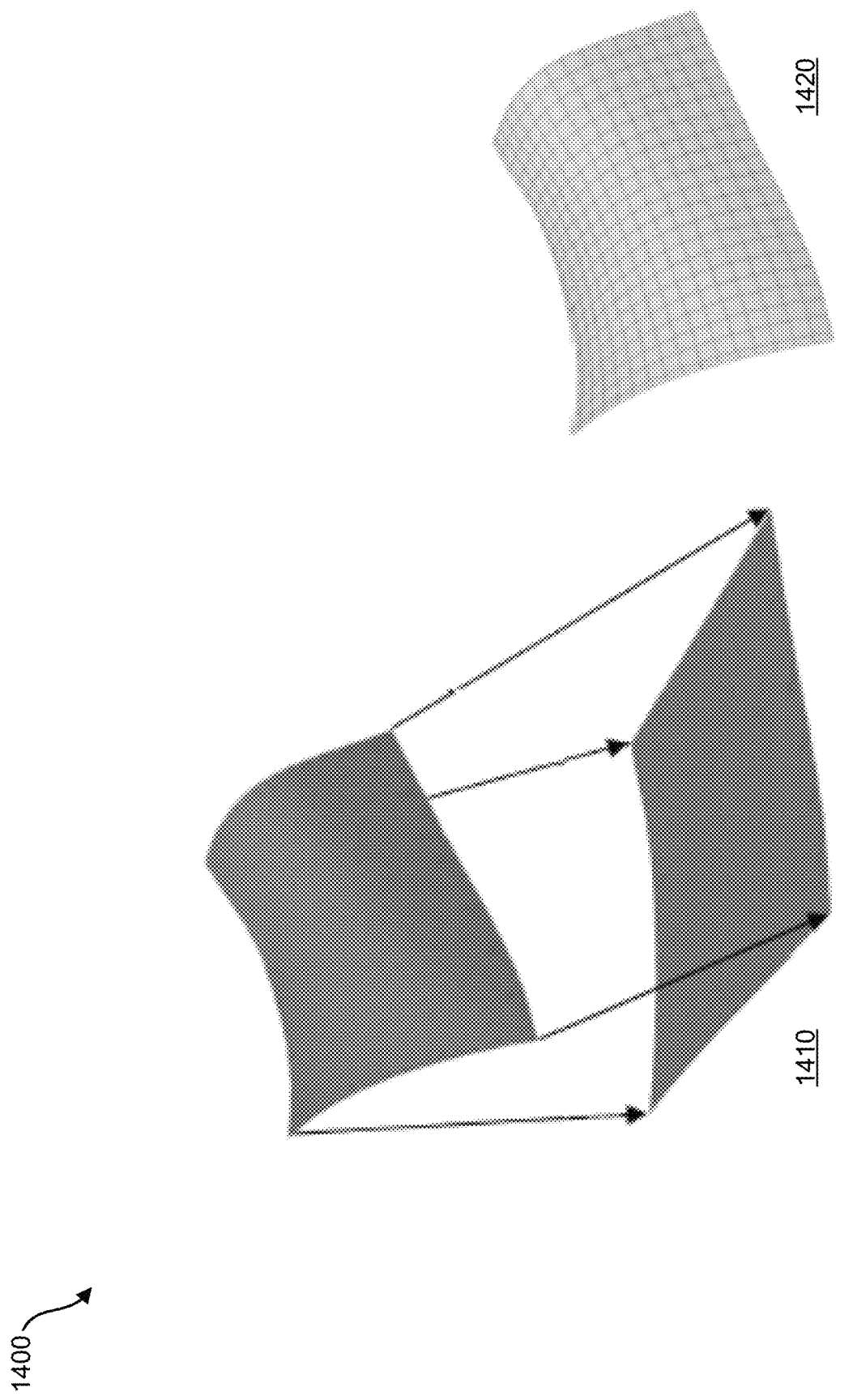
FIG. 14 is a diagram illustrating flattening of triangles to a plane to generate a uv-space and, additionally, a resulting nurbs patch approximating the triangles.

Next a smooth normal field is calculated for each curve by projecting the vertices of the curve/polyline onto the mesh and using the normal at the given triangle. This ensures that even though each quad is fit independently, they come together tangentially. To generate a nurbs patch for each quad in the layout, first the edges need to be imprinted onto the triangle mesh as in diagram 1300 of FIG. 13, then the triangle submesh needs to be flattened, thereby minimizing the angle and length distortion of the mapping to create a 2D uv-space for the nurbs patch as in diagram 1400 of FIG. 14 (with 1410 illustrating the mapping and 1420 illustrating the nurbs patch).

Finally, the nurbs patch 1420 can be fit by evaluating the mapping between the flattened uv-space and the tangent constraint on the boundary provided through the normal fields on the edges. Due to the decoupling of the quads and the normal field this operation can be performed in parallel.

Figure 15:
FIG. 15 is a diagram illustrating reflection lines showing smoothness of a patch to its neighbors.

Due to the original bc faces being available, quads which share a boundary edge can take advantage of this extra information and use the geometry from the CAD edge rather than from an edge of the quad patch. Once all the patches are created, they are stitched together along with the bc faces to form a closed CAD model. The resulting CAD model consists of original bc faces and newly creates CAD faces which are curvature aligned and connect smoothly (FIG. 15). The edges between new CAD faces and bc faces can be either sharp or smooth, dependent on how the original model was connected.

Figure 16:
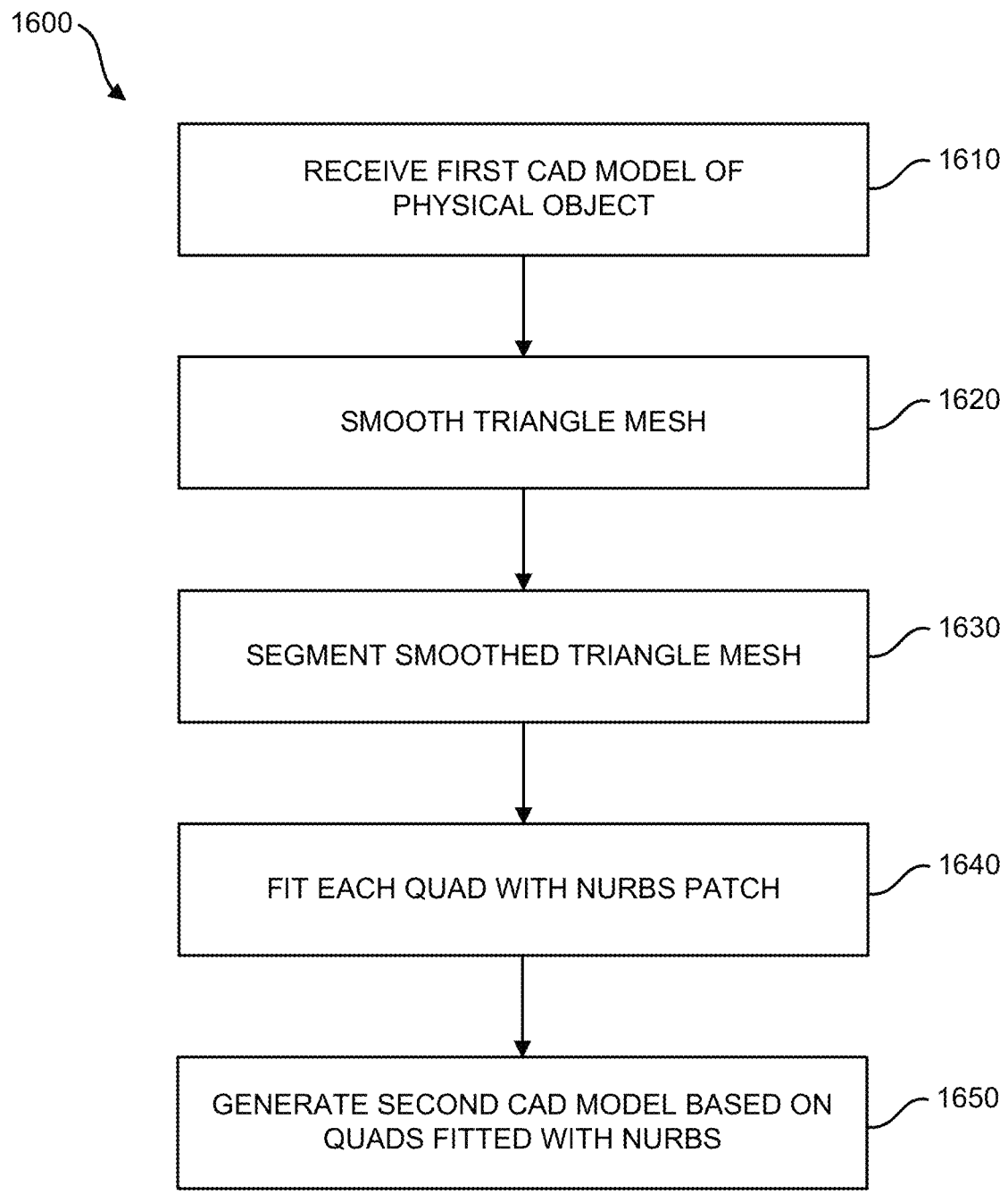
FIG. 16 is a process flow diagram illustrating generation of a CAD model.

FIG. 16 is a diagram 1600 in which, at 1610, a first computer-aided design (CAD) model is received which represents a physical object and which includes a triangle mesh with boundary condition faces. Thereafter, at 1620, the triangle mesh is smoothed such that the boundary conditions are maintained. Subsequently, at 1630, the smoothed triangle mesh is segmented which can involve generating a plurality of quads. Each of the quads are later fitted, at 1640, with a non-uniform rational basis spline (nurbs) patch. A second CAD model is then generated at 1650 which is based on the plurality of quads fitted with nurbs.

Figure 17:
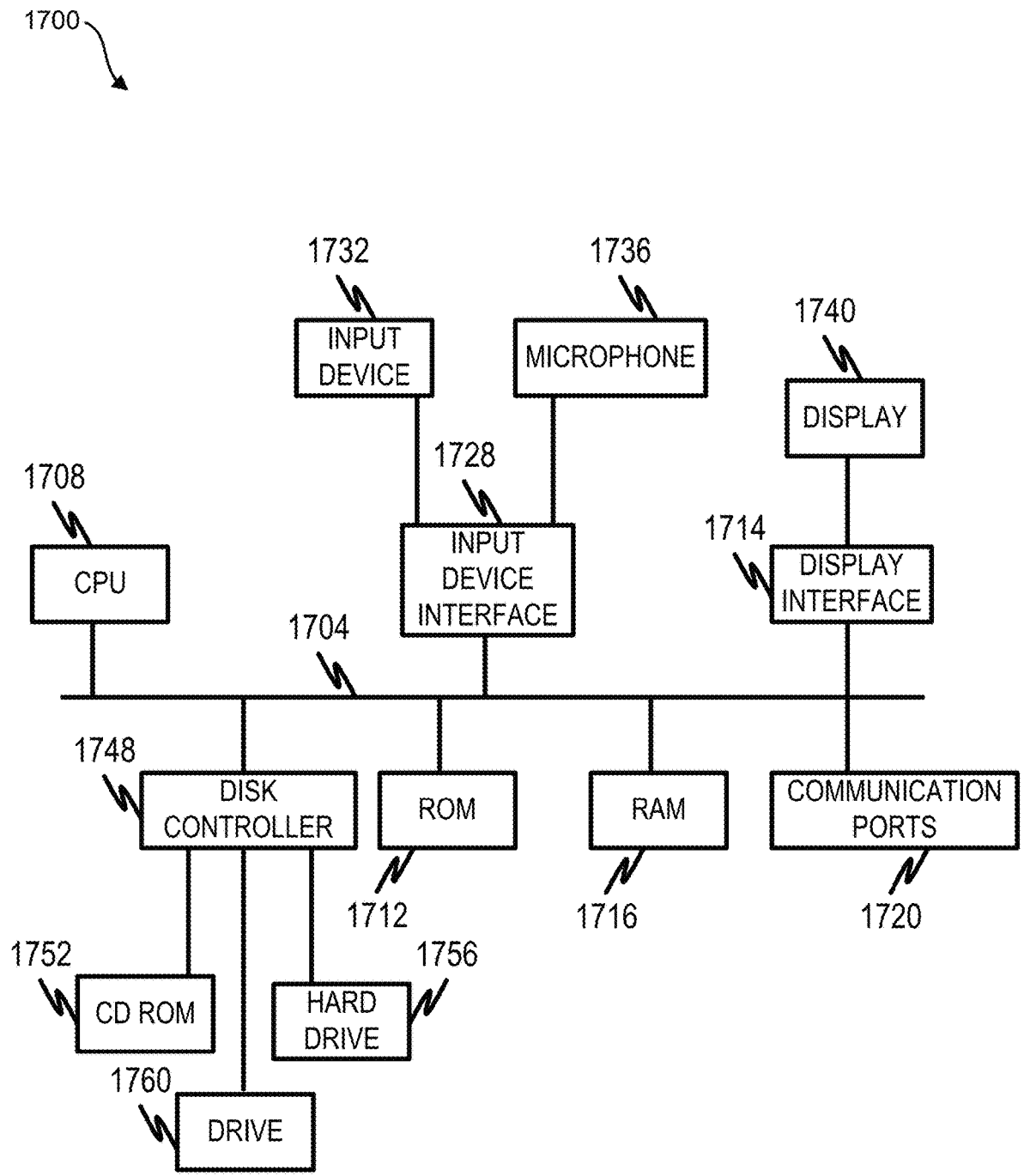
FIG. 17 is a diagram illustrating aspects of a computing device for implementing the current subject matter.

FIG. 17 is a diagram 1700 illustrating a sample computing device architecture for implementing various aspects described herein. A bus 1704 can serve as the information highway interconnecting the other illustrated components of the hardware. A processing system 1708 labeled CPU (central processing unit) (e.g., one or more computer processors/data processors at a given computer or at multiple computers), can perform calculations and logic operations required to execute a program. The processing system 1708 can include numerous cores/chips including graphical processing units (GPUs). A non-transitory processor-readable storage medium, such as read only memory (ROM) 1712 and random access memory (RAM) 1716, can be in communication with the processing system 1708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1748 can interface with one or more optional disk drives to the system bus 1704. These disk drives can be external or internal floppy disk drives such as 1760, external or internal CD-ROM, CD-R, CD-RW or DVD, or solid state drives such as 1752, or external or internal hard drives 1756. As indicated previously, these various disk drives 1752, 1756, 1760 and disk controllers are optional devices. The system bus 1704 can also include at least one communication port 1720 to allow for communication with external devices either physically connected to the computing system or available externally through a wired or wireless network. In some cases, the at least one communication port 1720 includes or otherwise comprises a network interface.

To provide for interaction with a user, the subject matter described herein can be implemented on a computing device having a display device 1740 (e.g., a CRT (cathode ray tube) or LCD (liquid crystal display) monitor) for displaying information obtained from the bus 1704 via a display interface 1714 to the user and an input device 1732 such as keyboard and/or a pointing device (e.g., a mouse or a trackball) and/or a touchscreen by which the user can provide input to the computer. Other kinds of input devices 1732 can be used to provide for interaction with a user as well; for example, feedback provided to the user can be any form of sensory feedback (e.g., visual feedback, auditory feedback by way of a microphone 1736, or tactile feedback); and input from the user can be received in any form, including acoustic, speech, or tactile input. The input device 1732 and the microphone 1736 can be coupled to and convey information via the bus 1704 by way of an input device interface 1728. Other computing devices, such as dedicated servers, can omit one or more of the display 1740 and display interface 1714, the input device 1732, the microphone 1736, and input device interface 1728.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together."

A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving a first computer-aided design (CAD) model to represent a physical object, the first CAD model comprising a triangle mesh with boundary condition faces;
   smoothing the triangle mesh, wherein the triangle mesh is smoothed with the boundary condition faces maintained;
   thickening the triangle mesh corresponding to the boundary condition faces;
   segmenting the smoothed triangle mesh after the thickening, wherein a plurality of quads are generated to segment the smoothed triangle mesh;
   fitting each of the quads with a non-uniform rational basis spline (nurbs) patch; and
   generating a second CAD model to represent the physical object, the second CAD model generated based on the plurality of quads fitted with nurbs.

2. The method of claim 1, wherein the first CAD model is topology optimization (TO) model.

3. The method of claim 2 wherein the smoothing results in an open smooth triangle mesh.

4. The method of claim 2, wherein the smoothing comprises:
   selectively smoothing triangles such that triangles corresponding to the boundary condition faces are unchanged and all triangles have angles below a threshold.

5. The method of claim 4, wherein the smoothing further comprises:
   triangulating the boundary condition faces.

6. The method of claim 1, wherein an offset distance of the thickening is based on an estimated automatic tolerance.

7. The method of claim 1 further comprising:
   performing a shrinkwrap operation on the thickened triangle mesh and on the triangle mesh with triangles removed.

8. The method of claim 7, wherein triangles in the triangle mesh after performing of the shrinkwrap operation are classified as belong to boundary condition faces or TO triangles.

9. The method of claim 8 further comprising:
identifying edges and vertices of TO triangles having curvature above a threshold and requiring smoothing; and
smoothing the identified edges and vertices of the TO triangle using a loop subdivision scheme.

10. The method of claim 9 further comprising:
smoothing all TO triangles using a bilinear filter.

11. The method of claim 10 further comprising:
deleting any remaining boundary condition faces from the triangle mesh to result in the open triangle smooth mesh.

12. The method of claim 11 further comprising:
computing a smooth crossfield and corresponding singularities for the open triangle smooth mesh.

13. The method of claim 12 further comprising:
smoothing the open triangle smooth mesh to reduce the computed singularities.

14. The method of claim 13 further comprising:
tracing only a portion of crossfield-coherent arcs between singularities.

15. The method of claim 14 further comprising:
trying to make as many quads as possible and generating T-junctions for the remaining patches.

16. The method of claim 15 further comprising:
smoothing an edge on a layout of the plurality of quads by:
moving a window along the edge over curves of the triangle mesh;
flattening each curve into two dimensions (2D);
smoothing the flattened 2D curves; and
re-projecting the smoothed, flattened 2D curves back to three dimensions (3D).

17. The method of claim 16 further comprising:
calculating a smooth normal field for each curve.

18. The method of claim 17 further comprising:
stitching together all patches along the boundary conditions to form the second CAD Model.

19. A system comprising:
at least one data processor; and
memory comprising instructions which, when executed by the at least one data processor, result in operations comprising:
receiving a first computer-aided design (CAD) model to represent a physical object, the first CAD model comprising a triangle mesh with boundary condition faces;
smoothing the triangle mesh, wherein the triangle mesh is smoothed with the boundary condition faces maintained;
thickening the triangle mesh corresponding to the boundary condition faces;
segmenting the smoothed triangle mesh after the thickening, wherein a plurality of quads are generated to segment the smoothed triangle mesh;
fitting each of the quads with a non-uniform rational basis spline (nurbs) patch; and
generating a second CAD model to represent the physical object, the second CAD model generated based on the plurality of quads fitted with nurbs.

20. A non-transitory computer program product storing instructions which, when executed by at least one computing device, result in operations comprising:
receiving a first computer-aided design (CAD) model to represent a physical object, the first CAD model comprising a triangle mesh with boundary condition faces;
smoothing the triangle mesh, wherein the triangle mesh is smoothed with the boundary condition faces maintained;
thickening the triangle mesh corresponding to the boundary condition faces;
segmenting the smoothed triangle mesh after the thickening, wherein a plurality of quads are generated to segment the smoothed triangle mesh;
fitting each of the quads with a non-uniform rational basis spline (nurbs) patch; and
generating a second CAD model to represent the physical object, the second CAD model generated based on the plurality of quads fitted with nurbs.

* * * * *